United States Patent [19]

Maruyama et al.

[11] Patent Number: 4,965,339

[45] Date of Patent: Oct. 23, 1990

[54] METHOD OF PREPARING SOLUBLE AROMATIC POLYIMIDES AND VARNISH COMPOSITIONS USING SAME

[75] Inventors: Yutaka Maruyama; Haruhiko Komoriya, both of Kamifukuoka; Kentaro Tsutsumi, Kawagoe, all of Japan

[73] Assignee: Central Glass Company, Limited, Ube, Japan

[21] Appl. No.: 390,887

[22] Filed: Aug. 8, 1989

[30] Foreign Application Priority Data

Aug. 16, 1988 [JP] Japan .................................. 63-203530

[51] Int. Cl.$^5$ .................... C08G 8/02; C08G 69/26
[52] U.S. Cl. .................................. 528/353; 528/125; 528/126; 528/128
[58] Field of Search ................ 528/353, 125, 126, 128

[56] References Cited

U.S. PATENT DOCUMENTS 4,203,922  5/1980  Jones et al. .......................... 528/185

Primary Examiner—John Kight, III
Assistant Examiner—P. Hampton-Hightower
Attorney, Agent, or Firm—Fleit, Jacobson, Cohn, Price, Holman & Stern

[57] ABSTRACT

Aromatic polyimides having a repeating unit represented by the general formula (1) are prepared by cyclization reaction of corresponding polyamic acids in an organic solvent in the presence of a lower monocarboxylic acid anhydride and a tertiary amine, e.g. triethylamine. The polyimides obtained by this method have high solubilities in various organic polar solvents and are soluble also in some organic nonpolar solvents. A solution of a polyimide prepared by this method in an organic solvent provides a varnish composition useful for wide purposes.

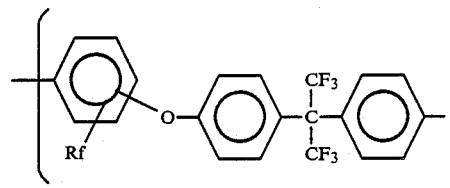

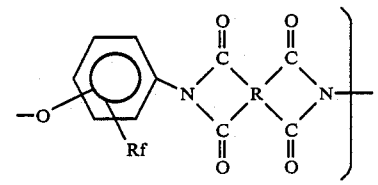

wherein Rf is a perfluoroalkyl group, R is a tetravalent organic group, and each —N= is at the meta- or para-position with respect to the aromatic ether bond —O—.

12 Claims, 2 Drawing Sheets

METHOD OF PREPARING SOLUBLE AROMATIC POLYIMIDES AND VARNISH COMPOSITIONS USING SAME

BACKGROUND OF THE INVENTION

This invention relates to a method of preparing aromatic polyimides which have perfluoroalkyl groups and are soluble in various organic solvents and varnish compositions using the obtained polyimides.

As synthetic resins aromatic polyimides are excellent in heat resistance as well as mechanical and electrical characteristics and have been widely used as industrial materials for various articles including electric and electronic devices.

Aromatic polyimides hitherto developed are hardly soluble in ordinary solvents except sulfuric acid. Therefore, it is practically impossible to use an aromatic polyimide solution for casting and coating purposes. A substitutive method is using a solution of an aromatic polyamic acid, which is the precursor of a desired polyimide, in an organic solvent. After casting the polyamic acid solution into a desired form or coating the solution on a substrate or base member the polyamic acid can be converted into the intended polyimide by a cyclization reaction. However, the application of this method is limited because a heat treatment at a temperature as high as 250°-400° C. is necessary for the cyclization reaction.

JP-A No. 60-49030 shows that aromatic polyimides characterized by a bulky structural unit having tetraphenylthiophene group are soluble in m-cresol and some other organic solvents. However, m-cresol is a solvent inconvenient for industrial handling, and the disclosed polyimides do not exhibit high solubilities in other organic solvents. JP-A No. 62-292836 shows preparing a soluble polyimide by carrying out the reaction of an aromatic diamine with pyromellitic dianhydride in a phenolic solvent. However, the obtained polyimide is not soluble in many kinds of organic solvents, though it is soluble in o-chlorophenol.

U.S. Pat. No. 3,179,630 shows preparing a polyimide by reacting an aromatic diamine with an aromatic tetracarboxylic acid dianhydride in an organic solvent in the presence of a lower monocarboxylic acid anhydride and a tertiary amine. This patent relates to aromatic polyimides not containing fluorine, and the obtained polyimides are insoluble in organic solvents.

SUMMARY OF THE INVENTION

It is an object of the invention to provide a method of preparing fluorine-containing aromatic polyimides which are readily soluble in various organic solvents.

It is another object of the invention to provide a varnish composition using a solution of an aromatic polyimide prepared by the method according to the invention in an organic solvent.

We have discovered that aromatic polyimides having high solubilities in various organic solvents convenient for industrial use can be prepared by cyclization reaction or a polyamic acid having perfluoroalkyl groups in its repeating units in an organic solvent in the presence of a lower fatty monocarboxylic acid anhydride and a tertiary amine.

More definitely, this invention provides a method of preparing a soluble aromatic polyimide having a repeating unit represented by the general formula (1),

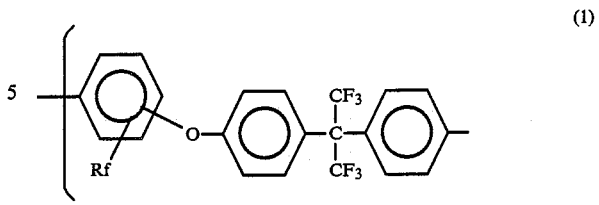

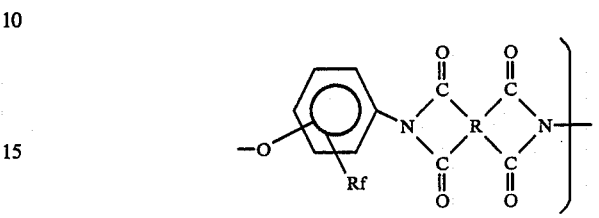

wherein Rf is a perfluoroalkyl group, R is a tetravalent organic group, and each —N= is at the meta- or para-position with respect to the aromatic ether bond —O—, the method comprising subjecting an aromatic polyamic acid having a repeating unit represented by the general formula (2) to cyclization reaction in an organic solvent in the presence of an aliphatic monocarboxylic acid anhydride having not more than 6 carbon atoms and a tertiary amine,

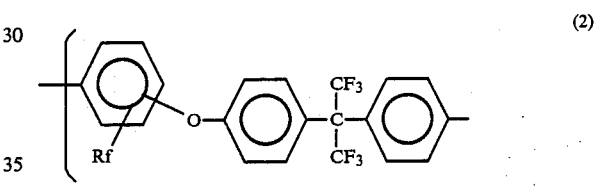

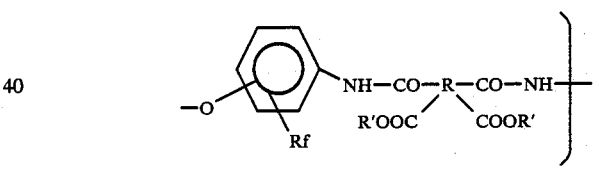

wherein Rf and R are as defined above with respect to the general formula (1), R' is hydrogen atom or a monovalent organic group, and each —NH— is at the meta- or para-position with respect to the aromatic ether bond —O—.

Aromatic polyimides prepared by the method according to the invention exhibit high solubilities in various popular organic solvents. For example, in widely used polar solvents such as dimethylformamide, dimethylacetamide, pyridine and N-methylpyrrolidone the solubilities of the obtained polyimides are tens of percents by weight.

It is possible to obtain aromatic polyimides having a repeating unit of the general formula (1) by cyclizing aromatic polyamic acids having a repeating unit of the general formula (2) by a heat treatment at about 250°-400° C. However, the polyimides obtained by the thermal cyclization method are insoluble or hardly soluble in organic solvents including the above named polar solvents.

By elementary analysis and infrared absorption spectrum analysis there is no difference in chemical structure between a polyimide obtained by the method according to the invention, viz. chemical cyclization of an aromatic polyamic acid, and a polyimide obtained by heat treatment of the same polyamic acid. The great difference between the products of the two methods in solubilities in organic solvents is presumably attributed to a difference in crystallinity. That is, the chemical cyclization method gives a polyimide low in crystallinity, whereas the thermal cyclization method gives a polyimide high in crystallinity. In fact the DTA (differential thermal analysis) graph of the former polyimide exhibits no peak up to a temperature of about 500° C., whereas the DTA graph of the latter polyimide exhibits an endothermic peak at a glass transition temperature of, for example, about 250° C.

Utilizing high solubilities of aromatic polyimides obtained by the method according to the invention, the present invention provides varnish compositions each comprising a solution of a polyimide obtained by the method according to the invention in an organic solvent, preferably a polar solvent. Of course the concentration of the polyimide in the solution is widely variable. A varnish composition according to the invention is useful for forming a polyimide coating film of a desired thickness on various substrates. Also it is possible to produce a polyimide film of a desired thickness by a flow coating method using a varnish composition according to the invention.

Organic solvents for aromatic polyimides obtained by the method according to the invention are not limited to the above named polar solvents. These polyimides are moderately soluble also in some nonpolar solvents such as cyclohexanone and ethyl acetate which are relatively low in viscosity and boiling point and in wide use. Therefore, it is possible to desirably control the viscosity and/or boiling point of a polyimide varnish composition according to the invention for improvement in workability by suitably mixing, for example, cyclohexanone or ethyl acetate with a polar solvent in which the polyimide is well soluble.

Aromatic polyimides prepared by the method according to the invention have excellent heat resistance. In general these polyimides do not undergo thermal decomposition in the air up to a temperature of about 500° C.

By virtue of the above described properties, aromatic polyimides obtained by the present invention have wide uses in various articles including electric and electronic devices, optical devices and machine parts.

DESCRIPTION OF THE PREFERRED EMBODIMENTS

Figure 1:
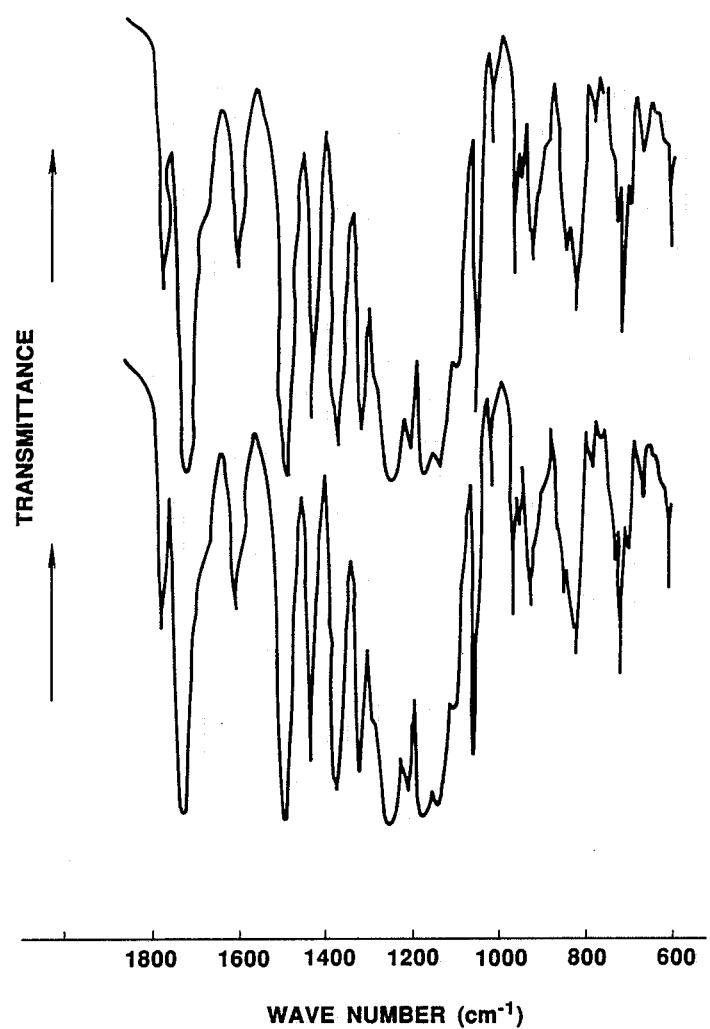
FIG. 1 shows infrared absorption spectra of a polyimide prepared from a polyamic acid in an example of the invention and another polyimide obtained by heat treatment of the same polyamic acid.

There are various methods for preparing aromatic polyamic acids represented by the general formula (2), but it is usual to employ the reaction of a fluorine-containing aromatic diamine represented by the general formula (3) with a tetracarboxylic acid or a derivative thereof. The reaction is carried out in a molten state or in a solution in an organic solvent.

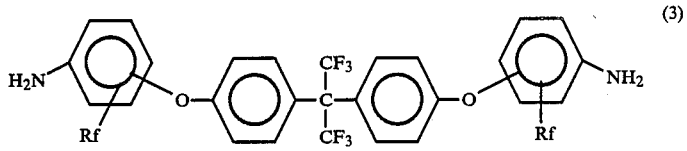

wherein Rf is a perfluoroalkyl group, and each $-NH_2$ is at the meta- or para-position with respect to the aromatic ether bond.

Good examples of the fluorine-containing aromatic diamine are 2,2-bis[4-(2-trifluoromethyl-4-aminophenoxy)phenyl]hexafluoropropane, 2,2-bis[4-(3-trifluoromethyl-5-aminophenoxy)phenyl]hexafluoropropane, 2,2-bis[4-(3-trifluoromethyl-4-aminophenoxy)phenyl]hexafluoropropane, 2,2-bis[4-(2-heptafluoropropyl-5-aminophenoxy)phenyl]hexafluoropropane, 2,2-bis[4-(4-heptafluoropropyl-5-aminophenoxy)phenyl]hexafluoropropane, 2,2-bis[4-(2-nonafluorobutyl-5-aminophenoxy)phenyl]hexafluoropropane and 2,2-bis[4-(4-nonafluorobutyl-5-aminophenoxy)phenyl]hexafluoropropane.

Good examples of the tetracarboxylic acid are pyromellitic acid, 3,3',4,4'-tetracarboxybiphenyl, 2,3,3',4'-tetracarboxybiphenyl, 3,3',4,4'-tetracarboxybiphenyl ether, 2,3,3',4'-tetracarboxybiphenyl ether, 3,3',4,4'-tetracarboxybenzophenone, 2,3,3',4'-tetracarboxybenzophenone, 2,3,6,7-tetracarboxynaphthalene, 1,4,5,7-tetracarboxynaphthalene, 1,2,5,6-tetracarboxynaphthalene, 3,3',4,4'-tetracarboxydiphenylmethane, 2,2-bis(3,4-dicarboxyphenyl)propane, 2,2-bis(3,4-dicarboxyphenyl)hexafluoropropane, 3,3',4,4'-tetracarboxydiphenylsulfone, 1,2,7,8-tetracarboxyperylene, 2,2-bis[4-(3,4-dicarboxyphenoxy)phenyl]propane and 2,2-bis[4-(3,4-dicarboxyphenoxy)phenyl]hexafluoropropane. Dianhydrides of these aromatic tetracarboxylic acids and some other derivatives such as the products of partial esterification with a lower alcohol are also useful.

The liquid medium for the cyclization reaction of the aromatic polyamic acid can be selected from various organic solvents including widely used solvents such as, for example, N,N-dimethylformamide, N,N-dimethylacetamide, dimethylsulfoxide, N-methyl-2-pyrrolidone, pyridine, benzene, cyclohexane, chloroform, carbon tetrachloride, acetonitrile and ethyl acetate.

The cyclization reaction must be carried out in the presence of an aliphatic monocarboxylic acid anhydride having not more than 6 carbon atoms and a tertiary amine.

For example, anhydride of acetic acid, propionic acid, butyric acid or valeric acid is used as the monocarboxylic acid anhydride.

For example, pyridine, trimethylamine, triethylamine or triethylenediamine is used as the tertiary amine.

Usually the cyclization reaction is carried out at temperatures ranging from room temperature to the boiling point of the employed organic solvent. The reaction is completed in several minutes to several hours.

The quantity of the organic solvent used for the cyclization reaction is not limited, but it is preferable that the concentration of the dissolved polyamic acid does not exceed 30 wt %. It is suitable to use at least 0.5 mol of an aliphatic monocarboxylic acid anhydride and at least 0.5 mol of a tertiary amine per mol of the polyamic acid. Preferably, 1 to 10 mols of the acid anhydride and 1 to 10 mols of the amine are used per mol of the polyamic acid. If the amount of either the acid anhydride or the amine is less than 0.5 mol the rate of the reaction is too low. Using more than 10 mols of the acid anhydride or the amine is uneconomical though the reaction is not significantly and adversely affected.

Elementary analysis, infrared spectrum analysis and thermogravimetric analysis (TG) of the products of the chemical cyclization method according to the invention have evidenced that complete imidization is accomplished by this method.

The invention is further illustrated by the following nonlimitative examples.

REFERENTIAL EXAMPLE 1

A polyamic acid was prepared in the following way.

In a 300-ml flask, 32.7 g of 2,2-bis[4-(2-trifluoromethyl-4-aminophenoxy)phenyl]hexafluoropropane was dissolved in 200 ml of dimethylacetamide. Stirring the solution, 10.9 g of pyromellitic dianhydride was added portionwise so as to take about 20 min to complete the addition. After that the solution was stirred for 1 hr at 12°–15° C. and for additional 3 hr at 20°–25° C. to accomplish the reaction between the aromatic diamine and the acid dianhydride.

Figure 2:
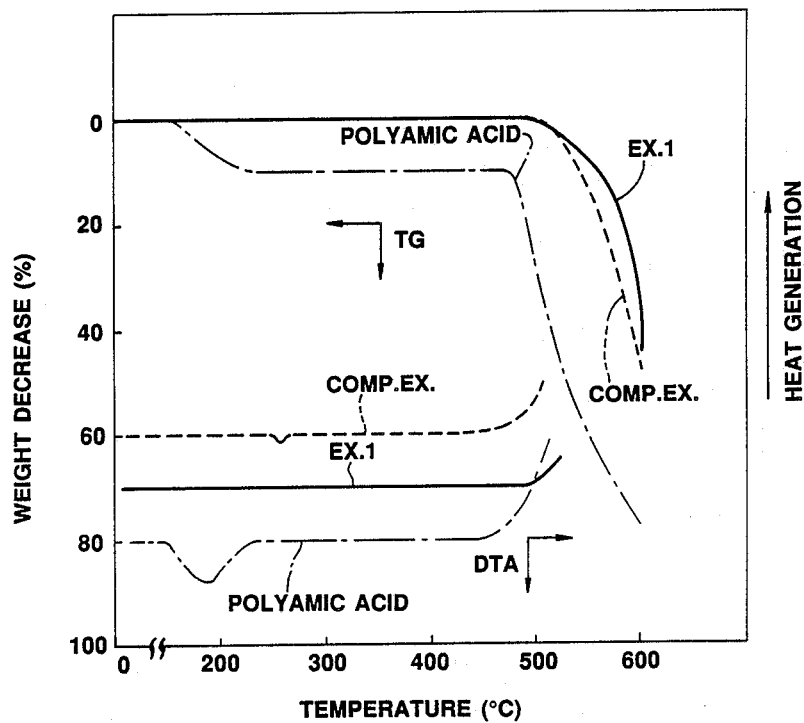
FIG. 2 shows the results of thermogravimetric analysis and differential thermal analysis of the polyamic acid and the polyimides mentioned above with respect to FIG. 1.

After completion of the reaction the solution was poured into 2 liters of ion-exchanged water to precipitate a polyamic acid, which weighed 42.7 g after drying. In dimethylacetamide the intrinsic viscosity of the obtained polyamic acid was 1.03 dL/g at 30° C. By infrared spectrum analysis and elementary analysis this polyamic acid proved to have repeating units represented by the following formula. TG and DTA data of this polymer are shown in FIG. 2.

EXAMPLE 1

In a 200-ml flask, 17.4 g of the polyamic acid prepared in Referential Example 1 was dissolved in 110 ml of thoroughly dehydrated dimethylacetamide. Separately, in a 500-ml flask provided with a stirrer and a nitrogen gas introducing pipe a mixed solution was prepared by stirring a mixture of 100 ml of thoroughly dehydrated pyridine, 44 ml of acetic anhydride and 24 ml of triethylamine. Stirring this mixed solution in a nitrogen gas stream, the initially prepared solution of the polyamic acid was added all at once. The resultant mixed liquid was continuously stirred for 3 hr at room temperature to accomplish cyclization of the polyamic acid.

After the reaction the reaction liquid was poured into 2 liters of ion-exchanged water to precipitate a polymer having a pale yellow color. The precipitate was recovered by filtration and dried for 2 hr at 120° C. under reduced pressure to obtain 12 g of a polymer. In dimethylacetamide the intrinsic viscosity of the obtained polymer was 1.10 dL/g at 30° C. FIG. 1 shows the infrared absorption spectrum of this polymer, and FIG. 2 shows the results of TG and DTA of this polymer. From these analytical results and the result of elementary annalysis the obtained polymer was confirmed to be a polyimide having the repeating unit represented by the following formula.

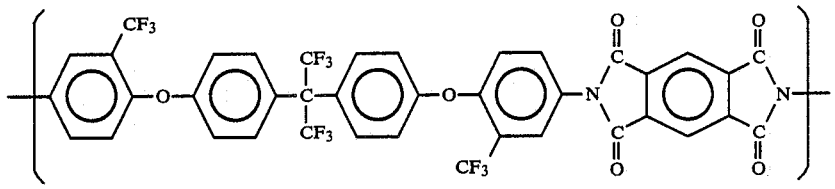

COMPARATIVE EXAMPLE

The polyamic acid prepared in Referential Example 1 was dissolved in dimethylacetamide to obtain a 20 wt % solution, and the solution was cast into a 100 μm thick film on a glass plate. By heating at 300° C. for 3 hr the cast film turned into a polyimide film, which was transparent and had a pale yellow color. FIG. 1 contains the infrared absorption spectrum of this polyimide film. As can be seen the infrared spectrum was identical with that of the polyimide prepared in Example 1. Elementary analysis of the polyimide obtained in this comparative example gave the same result as the analysis of the polyimide obtained in Example 1. Evidently the polyimide obtained in this comparative example was identical in chemical structure with the polyimide obtained in Example 1. The TG and DTA data of the polyimide obtained in this comparative example are shown in FIG. 2. The DTA graph exhibits an endothermic peak at

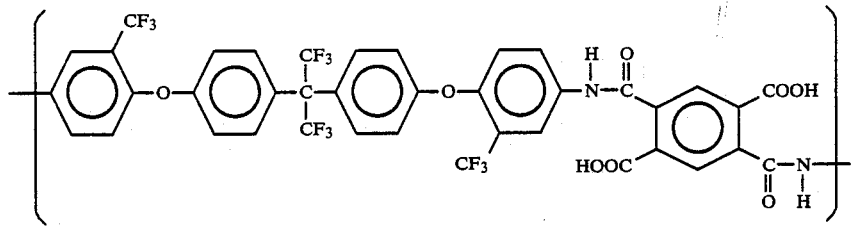

about 250° C. This peak indicates a glass transition temperature of the polyimide.

However, in solubilities in various organic solvents the polyimide obtained in Comparative Example was utterly different from the polyimide prepared in Example 1. The following table shows the solubilities of the respective polyimides in representative organic solvents at room temperature.

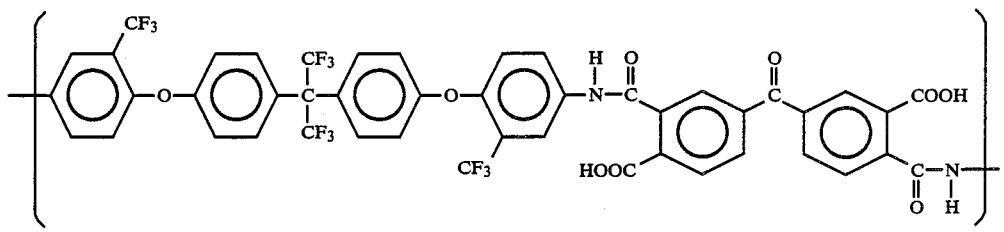

| Solvent | Solubility of Polyimide (wt %) | |
|---|---|---|
| | Example 1 | Comp. Example |
| N,N-dimethylacetamide | ≧40 | 0 |
| N,N-dimethylformamide | ≧40 | 0 |
| N-methyl-2-pyrrolidone | ≧40 | 2 |
| pyridine | ≧40 | 2 |
| cyclohexanone | ≧5 | 0 |
| ethyl acetate | ≧5 | 0 |

EXAMPLE 2

The polyimide prepared in Example 1 was dissolved in dimethylformamide to obtain a 25 wt % solution, and using a film applicator the solution was cast into a film on a glass plate. The cast film was dried by heating at 100° C. for 30 min to thereby form a polyimide coating film. The film had a thickness of 30 μm and was transparent. By the cross-cut peeling test the polyimide film proved to be sufficiently high in the tightness of adhesion to the glass surface.

REFERENTIAL EXAMPLE 2

By the same method as in Referential Example 1, 32.7 g of 2,2-bis[4-(2-trifluoromethyl-4-aminophenoxy)phenyl]hexafluoropropane was reacted with 16.1 g of 3,3',4,4'-tetracarboxybenzophenone dianhydride to obtain a polyamic acid.

In dimethylacetamide the intrinsic viscosity of the obtained polyamic acid was 0.78 dL/g at room temperature. By infrared spectrum analysis and elementary analysis the polyamic acid proved to have the repeating unit represented by the following formula.

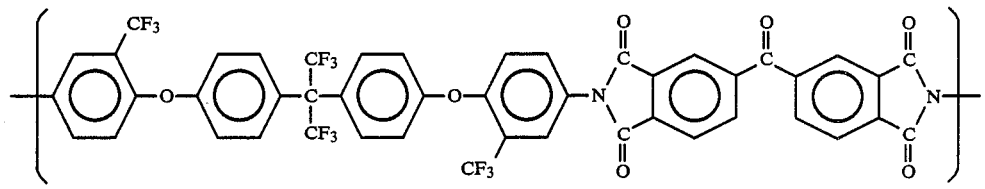

EXAMPLE 3

The polyamic acid prepared in Referential Example 2 was subjected to cyclization reaction in pyridine in the presence of acetic anhydride and triethylamine by the same method and under the same conditions as in Example 1. The reaction gave a polyimide of a pale yellow color.

In diemthylacetamide the intrinsic viscosity of the polyimide was 0.81 dL/g. By infrared spectrum analysis and elementary analysis the polyimide proved to have the repeating units represented by the following formula.

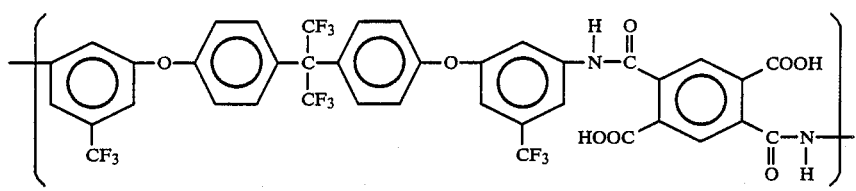

In solubilities in the organic solvents named in the foregoing table, this polyimide was approximately equivalent to the polyimide prepared in Example 1 except that the solubility of this polyimide in either cyclohexanone or ethyl acetate was more than 15 wt %.

REFERENTIAL EXAMPLE 3

By the same method as in Referential Example 1, 32.7 g of 2,2-bis[4-(3-trifluoromethyl-5-aminophenoxy)phenyl]hexafluoropropane was reacted with 10.9 g of pyromellitic dianhydride to obtain a polyamic acid.

In dimethylacetamide the intrinsic viscosity of the obtained polyamic acid was 1.10 dL/g at room temperature. By infrared spectrum analysis and elementary analysis the polyamic acid proved to have the repeating unit represented by the following formula.

EXAMPLE 4

The polyamic acid prepared in Referential Example 3 was subjected to cyclizing reaction in pyridine in the presence of acetic anhydride and triethylamine by the same method and under the same conditions as in Example 1. The reaction gave a polyimide. In dimethylacetamide the intrinsic viscosity of this polyimide was 1.11 dL/g. By infrared spectrum analysis and elementary analysis this polyimide proved to have the repeating unit represented by the following formula.

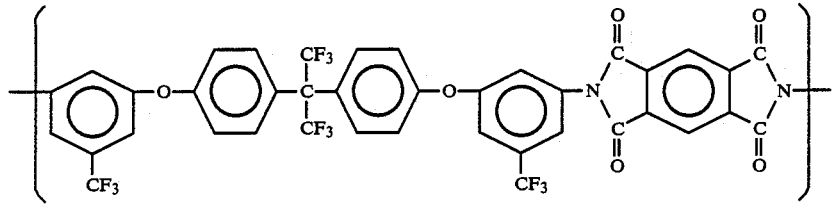

In solubilities in the organic solvents named in the foregoing table, this polyimide was approximately equivalent to the polyimide prepared in Example 1.

What is claimed is:

1. A method of preparing an aromatic polyimide soluble in organic solvents, the polyimide having a repeating unit represented by the general formula (1),

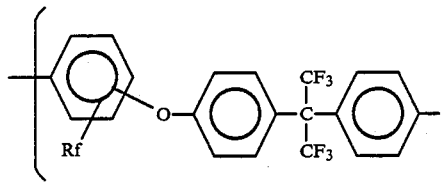
(1)

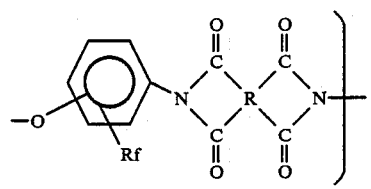

wherein Rf is a perfluoroalkyl group, R is a tetravalent organic group, and each —N= is at the meta- or para-position with respect to the aromatic ether bond —O—, the method comprising subjecting an aromatic polyamic acid having a repeating unit represented by the general formula (2) to cyclization reaction in an organic solvent in the presence of an aliphatic monocarboxylic acid anhydride having not more than 6 carbon atoms and a tertiary amine,

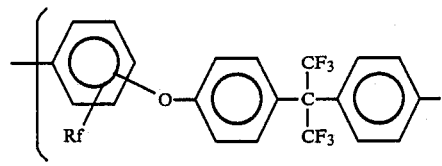
(2)

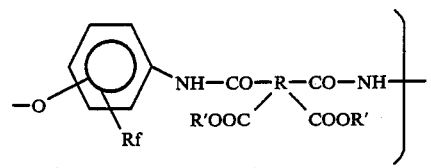

wherein Rf and R are as defined above with respect to the general formula (1), R' is hydrogen atom or a monovalent organic group, and each —NH— is at the meta- or para-position with respect to the aromatic ether bond —O—.

2. A method according to claim 1, wherein said monocarboxylic acid anhydride is selected from the group consisting of acetic anhydride, propionic anhydride, butyric anhydride and valeric anhydride.

3. A method according to claim 1, wherein the amount of said monocarboxylic acid anhydride is at least 0.5 mol per mol of said polyamic acid.

4. A method according to claim 1, wherein said tertiary amine is selected from the group consisting of pyridine, trimethylamine, triethylamine and triethylenediamine.

5. A method according to claim 1, wherein the amount of said tertiary amine is at least 0.5 mol per mol of said polyamic acid.

6. A method according to claim 1, wherein said cyclization reaction is carried out at a temperature in the range from room temperature to the boiling point of said organic solvent.

7. A method according to claim 1, wherein the tetravalent organic group represented by R in the general formulas (1) and (2) is the residue of benzene, biphenyl, biphenyl ether, benzophenone, diphenylmethane, diphenylpropane, diphenylhexafluoropropane, diphenylsulfone, naphthalene or perylene.

8. A varnish composition, comprising a solution of an aromatic polyimide prepared by a method according to claim 1 in an organic solvent.

9. A varnish composition according to claim 8, wherein said organic solvent comprises a polar solvent.

10. A varnish composition according to claim 9, wherein said polar solvent is selected from the group consisting of N,N-dimethylacetamide, N,N-dimethylformamide, N-methyl-2-pyrrolidone and pyridine.

11. A varnish composition according to claim 10, wherein said organic solvent further comprises a nonpolar solvent selected from the group consisting of cyclohexanone and ethyl acetate.

12. A method according to claim 7, wherein each perfluoroalkyl group represented by Rf in the general formulas (1) and (2) is —$CF_3$.

* * * * *